W. C. SQUIER.
Grain Drill.
No. 18,360. Patented Oct. 6, 1857.
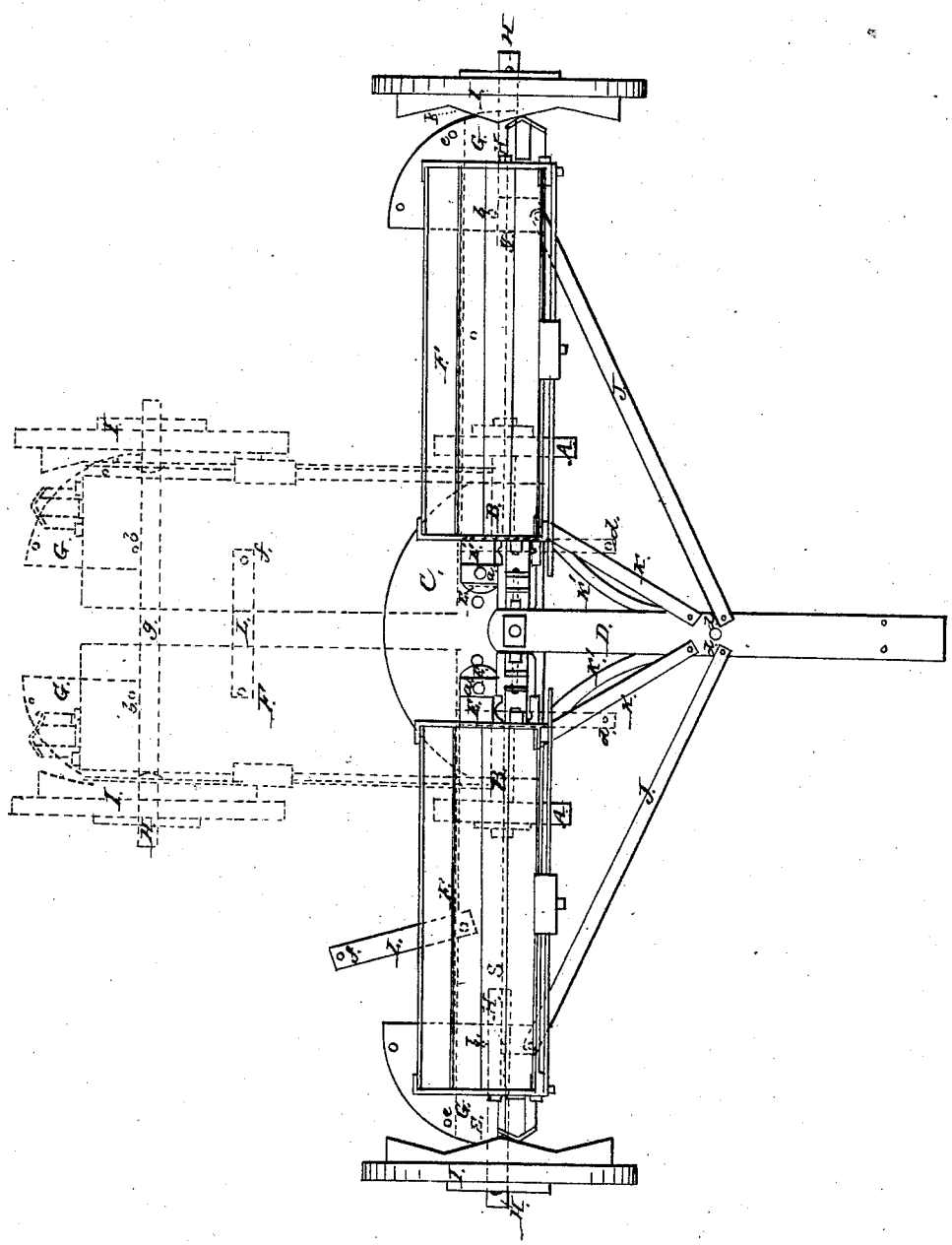

UNITED STATES PATENT OFFICE.

WILLIAM C. SQUIER, OF ROCKFORD, ILLINOIS.

IMPROVEMENT IN SEED-SOWING MACHINES.

Specification forming part of Letters Patent No. 18,360, dated October 6, 1857.

*To all whom it may concern:*

Be it known that I, WM. C. SQUIER, of Rockford, in the county of Winnebago and State of Illinois, have invented a new and useful Improvement in Folding Seeding-Machines; and I do hereby declare that the following is a full, clear, and exact description of the same, reference being had to the accompanying drawing, forming part of this specification, in which a plan or top view of a seeding-machine constructed after my invention is shown, the machine being represented as expanded in full black lines and as folded in red lines.

The nature of my invention consists in the peculiar manner in which the seeding-machine is constructed, so as to be capable of being expanded when required for use and folded and contracted when not in use, or while being transported from the field to the house or from the house to the field, this arrangement avoiding all inconvenience in passing through narrow gates and passages, and economizing room in the farm-yard or implement-house after the planting season has expired.

To enable others skilled in the art to make and use my invention, I will proceed to describe its construction and operation.

In carrying out my invention I provide a truck consisting of two wheels, A A, an axle, B, stationary circular bed-plate C, and tongue D.

To the upper side of the circular bed-plate C, I pivot, as shown at $a\ a$, two oblong bed-pieces, E E', so that one shall come on the right and the other on the left side of the tongue. The bed-pieces E E' each carry a hopper, F, which is fastened firmly to them, said hoppers being furnished with discharge-passages, a vibrating slide, and suitable devices for distributing and regulating the discharge of the seed.

On the outer end of the bed-pieces E E', I pivot, as shown at $b\ b$, circle-plates G G, the ends of the bed-pieces coming between the two pieces of which each of the circle-plates is composed. These circle-plates are kept from turning by stop-pins $e\ e$.

To the under side of the circle-plates short axles H H are securely fastened. The axles carry the propelling-wheels I, which have serpentine cams arranged on their inner faces for operating the vibrating seed-slide of the hopper.

From the bed-pieces E E' to the tongue I extend braces J J, which are pivoted to the bed-pieces at $c\ c$ and connected by stop-pins at $d\ d$ to the tongue. Other braces, K K, are also provided from the circle or bed-plate to the tongue, and a link, L, is pivoted to the rear side of one of the bed-pieces, so that the bed-piece E may be coupled together with E' when the machine is folded. The inner ends of the short axles H H are likewise so shaped, as shown at $g$, that one shall receive the other, and thus couple together and support each other, when the machine is folded.

The operation of folding the machine from the condition shown in black to the condition shown in red is as follows: First withdraw the stop-pins $d\ d$ of the braces from the holes in the tongue, and then withdraw the stop-pins $e\ e$ of the circle-plates. All being now ready for folding, move the bed-pieces on their pivots $a\ a$ round, as shown in red. Then turn the wheels and circle-plates on their pivots $b\ b$ to the position shown in red. The machine being folded and properly adjusted, insert the pin $f$ of the coupling-link L in the hole of the bed-piece E' and the stop-pins $e\ e$ in the holes in the circle-plates.

The operation of unfolding is as follows: Withdraw the pin of the coupling-link L, shift the wheels by turning the circle-plates G G round to the end of the hoppers, insert the stop-pins $e\ e$ of the circle-plates, move the hoppers and bed-pieces on their pivots $a\ a$ round till they are at right angles with the tongue, adjust the braces J J, and couple the hoppers and bed-pieces to the tongue by inserting the stop-pins $d\ d$.

Having thus described the nature and operation of my invention, what I claim as new, and desire to secure by Letters Patent, is—

Having the bed-pieces E E', which carry the hopper F F, capable of turning on pivots $a\ a$ of the circular bed-plate C, and the short axles H H, on pivots $b\ b$ of said bed-pieces E E', and the whole retained in proper condition, when expanded, by means of braces J J and stop-pins $d\ d$ and $e\ e$, and when folded by means of braces J J, link L, stop-pins $d\ d$ and $e\ e$, and coupling $g$ on end of axles, substantially as and for the purposes set forth.

The above specification of my improvement in seed-sowing machines signed and witnessed this 20th day of August, 1857.

WILLIAM C. SQUIER.

Witnesses:
   GOODWIN Y. AT LEE,
   EDM. F. BROWN.